(12) United States Patent
Grassmel et al.

(10) Patent No.: US 7,279,656 B2
(45) Date of Patent: Oct. 9, 2007

(54) METHOD OF AND APPARATUS FOR CHANGING THE PERMEABILITY OF TUBULAR ENVELOPES OF ROD-SHAPED ARTICLES OF THE TOBACCO PROCESSING INDUSTRY

(75) Inventors: Ralf Grassmel, Jork (DE); Norbert Lange, Glinde (DE)

(73) Assignee: Hauni Maschinenbau AG, Hamburg (DE)

( * ) Notice: Subject to any disclaimer, the term of this patent is extended or adjusted under 35 U.S.C. 154(b) by 83 days.

(21) Appl. No.: 10/993,366

(22) Filed: Nov. 22, 2004

(65) Prior Publication Data

US 2005/0127046 A1 Jun. 16, 2005

(30) Foreign Application Priority Data

Nov. 21, 2003 (DE) ................. 103 54 743

(51) Int. Cl.
*B23K 26/38* (2006.01)
*A24C 1/38* (2006.01)

(52) U.S. Cl. .............................. 219/121.7; 219/121.78; 131/281

(58) Field of Classification Search ................................
219/121.68–121.71, 121.74, 121.75; 131/281
See application file for complete search history.

(56) References Cited

U.S. PATENT DOCUMENTS

| | | | | |
|---|---|---|---|---|
| 4,140,137 A | * | 2/1979 | Snow | 131/281 |
| 4,281,670 A | * | 8/1981 | Heitmann et al. | 131/281 |
| 4,585,919 A | * | 4/1986 | Mattei et al. | 219/121.7 |
| 4,825,882 A | | 5/1989 | Hinz | |
| 4,889,140 A | * | 12/1989 | Lorenzen et al. | 131/281 |
| 5,084,715 A | * | 1/1992 | Mama | 347/259 |
| 5,135,008 A | | 8/1992 | Oesterling et al. | |

FOREIGN PATENT DOCUMENTS

| | | |
|---|---|---|
| DE | 33 13 064 C2 | 11/1983 |
| DE | 35 10 119 C2 | 10/1985 |
| DE | 40 13 642 A1 | 10/1990 |
| DE | 694 18 685 T2 | 12/1999 |
| DE | 696 11 580 T2 | 8/2001 |
| DE | 101 11 667 A1 | 9/2002 |
| EP | 0 402 684 A1 | 12/1990 |
| EP | 0 761 107 A1 | 3/1997 |
| GB | 2 260 256 A | 4/1993 |

\* cited by examiner

*Primary Examiner*—Samuel M. Heinrich
(74) *Attorney, Agent, or Firm*—Venable LLP; Robert Kinberg; Ryan M. Flandro

(57) ABSTRACT

The invention relates to a method of and to an apparatus for perforating the tubular wrappers of plain or filter cigarettes and other rod-shaped articles of the tobacco processing industry. The articles are advanced sideways at the periphery of a rotary drum-shaped carrier which cooperates with a device serving to roll them about their longitudinal axes while the wrappers are being perforated by one or more pulsating beams issuing from one or more lasers and passing through a stationary cylinder lens on their way to the facets of a rotating cylindrical mirror which directs the beam(s) across the axis of the carrier and pivots the beam(s) about such axis on its or their way radially outwardly of the carrier toward a first set of stationary deflecting mirrors. These mirrors deflect the beam(s) in at least substantial parallelism with the axis of the carrier at locations radially outwardly of the latter's periphery toward a second set of deflecting mirrors which, in turn, direct the beam(s) substantially radially toward the axis of the carrier and against spherical lenses which focus the beam(s) upon the wrappers of the articles.

27 Claims, 7 Drawing Sheets

METHOD OF AND APPARATUS FOR CHANGING THE PERMEABILITY OF TUBULAR ENVELOPES OF ROD-SHAPED ARTICLES OF THE TOBACCO PROCESSING INDUSTRY

CROSS-REFERENCE TO RELATED CASES

This application claims the priority of the commonly owned German patent application Serial No. 103 54 743.6-23-DE filed Nov. 21, 2003.

The disclosure of the above-referenced German patent application, as well as the disclosures of all other patent applications, patents and other publications identified in the specification of the present application, are incorporated herein by reference.

BACKGROUND OF THE INVENTION

The present invention relates to improvements in methods of and in apparatus for changing the permeability of tubular envelopes or wrappers of rod-shaped articles of the tobacco processing industry. Such articles include plain cigarettes, cigars, cigarillos and analogous smokers' products of unit length or multiple unit length, continuous cigarette rods or the like, tobacco smoke filtering mouthpieces of unit length or multiple unit length as well as continuous filter rods.

It is well known to alter or adjust the permeability of wrapping material (such as cigarette paper or so-called tipping paper) for rod-shaped fillers which consist of or contain shredded tobacco leaf laminae, comminuted reconstituted or substitute tobacco, filter material for tobacco smoke and/or other constituents of rod-shaped smokers' products. It is also well known to select the permeability of such, wrapping material by resorting to adjustable devices which perforate the wrapping material, e.g., mechanically by employing needles or analogous implements, or by resorting to one or more lasers or other suitable radiation sources.

As a rule, a filter cigarette which is provided with an air-transmitting wrapper is permeable in the region of its filter mouthpiece so that, while drawing tobacco smoke from the lighted tobacco-containing portion of such article, the smoker simultaneously draws and normally or often inhales atmospheric air which enters through the perforations in the tubular envelope for filter material. Such mixing of tobacco smoke with atmospheric air in the interior of a filter cigarette exhibits numerous important advantages. Thus, the smoker inhales a smoke which contains less nicotine and/or tar, and the atmospheric air entering the filter cigarette through the perforations in the tubular envelope for filter material reduces the temperature of the column of smoke entering the mouth of the smoker.

FIG. 17 of U.S. Pat. No. 4,281,670 (granted Aug. 4, 1981 to Heitmann et al. for "APPARATUS FOR INCREASING THE PERMEABILITY OF WRAPPING MATERIAL FOR ROD-SHAPED SMOKERS' PRODUCTS") illustrates a portion of a filter cigarette making machine wherein successive groups of three coaxial rod-shaped commodities (namely two plain cigarettes of unit length and a filter mouthpiece of double unit length between them) are caused to move sideways in an arcuate gap between the fluted cylindrical peripheral surface of a rotary drum-shaped wrapping conveyor or carrier and the complementary concave countersurface of a stationary block-shaped rolling device. The latter is provided with cutouts for the passage of pulsating beams issuing from two lasers and arranged to penetrate through adhesive-coated uniting bands which are convoluted around the filter mouthpieces and the adjacent portions od the respective plain cigarettes of unit length while these rod-shaped articles are caused to roll in the aforementioned gap. Each beam is caused to provide the uniting bands with pairs of perforations which are located diametrically opposite each other, and each pulsating beam is arranged to provide successive convoluted uniting bands with several pairs of perforations.

The width of the arcuate gap between the convex surface of the rotating drum-shaped wrapping conveyor and the concave surface of the stationary rolling device is less than the diameters of rod-shaped articles in the gap. This is necessary in order to ensure that the groups of coaxial articles are compelled to rotate in a predictable fashion about their common axis during travel through the gap, as well as to ensure predictable convoluting of the adhesive-coated uniting bands around the rod-shaped filter mouthpieces and the adjacent end portions of the respective plain cigarettes of unit length during conversion of such articles into filter cigarettes of double unit length. Thus, the wrapping conveyor and the block-shaped rolling device subject the rod-shaped articles in the gap to rather pronounced mechanical stresses which are apt to adversely affect the appearance and/or the quality of the ultimate products, especially in a modern filter cigarette maker wherein the rod-shaped articles in the gap must advance at a very high speed if the maker is to turn out desired quantities of filter cigarettes per unit of time.

Certain attempts to overcome the drawbacks of the just described machines, i.e., to reduce the stressing of the rod-shaped components and of the wrappers of filter cigarettes or analogous commodities, are disclosed in German patent No. 33 13 064 A1 which proposes to advance the cylindrical parts of the smokers' products in flutes provided in the cylindrical peripheral surface of a rotary drum-shaped conveyor. This conveyor is driven by a first hollow shaft which confines a part of a rotary second hollow shaft. One end portion of the second hollow shaft extends beyond the first hollow shaft and contains a beam divider arranged to direct beams of radiation against a mirror. Each of the just mentioned beam divider and mirror cooperates with a focussing lens, and these parts are confined in the aforementioned end portion of the second hollow shaft. The laser is located at the other ends of the hollow shafts and is arranged to furnish a pulsating beam which is caused to advance through the second hollow shaft and is split into two discrete beams before it reaches the rod-shaped components of the smokers' products. Such discrete beams advance through a slit, which is provided in one of the shafts, prior to impinging upon the exposed filter mouthpiece of a filter cigarette of unit length. The inner shaft is caused to rotate in the direction of rotation of the drum-shaped conveyor but at a higher speed; this is intended to ensure that the wrapper of each discrete filter cigarette is provided with several successive perforations during each revolution of the second (inner) hollow shaft.

A drawback of the just described proposal is that the apparatus which is disclosed in this German patent can be utilized only in conjunction with the treatment of filter cigarettes of unit length.

Similar drawbacks are exhibited by the apparatus which is disclosed in German patent No. 35 101 19 C2. This apparatus is designed to drill holes in the wrappers of cigarettes or the like. The patented apparatus employs a source of a laser beam which impinges upon a diffuser lens so that its components act upon (i.e., perforate) rod-shaped articles in discrete flutes turnably arranged on a drum-shaped conveyor for rod-shaped articles.

OBJECTS OF THE INVENTION

An object of the instant invention is to provide a method of and an apparatus for enhancing the permeability of wrappers of cigarettes and/or other rod-shaped smokers' products in a manner superior to that achievable by resorting to presently known methods and apparatus.

Another object of the invention is to provide a method of and an apparatus for perforating the wrappers of filter cigarettes or the like which can be utilized to turn out smokers' products or parts thereof superior to those obtainable by resorting to heretofore known methods and apparatus.

A further object of the present invention is to provide a method and an apparatus which can be resorted to for simultaneously making several rod-shaped smokers' products of a quality superior to that of presently obtainable products.

An additional object of the invention is to provide a perforating apparatus for the wrappers of smokers' products which utilizes one or more lasers or analogous energy sources in a novel and improved way.

An ancillary object of our invention is to provide a machine for the making of filter cigarettes or analogous rod-shaped smokers' products which embodies the above outlined apparatus.

A further object of the invention is to provide a novel and improved arrangement of optical elements which can be put to use in the above outlined improved apparatus.

An additional object of our invention is to provide a relatively simple and inexpensive apparatus which can be utilized to perforate the tubular envelopes of filter cigarettes or other rod-shaped smokers' products in a novel and improved way and can be installed in or combined with filter cigarette making or analogous machines in a novel and improved manner.

SUMMARY OF THE INVENTION

One feature of the present invention resides in the provision of an apparatus for perforating tubular envelopes of rod-shaped articles (e.g., filter cigarettes of double unit length) of the tobacco processing industry. The improved apparatus comprises at least one substantially drum-shaped carrier which is rotatable about a predetermined axis and the peripheral portion of which is arranged to support a plurality of articles for sidewise movement about the predetermined axis, a source of radiation (e.g., a $CO_2$ laser) which is arranged to emit at least one beam of radiation of the type adapted to perforate the envelopes of articles being borne by the carrier, means (including, e.g., a polygonal laser beam directing or orienting mirror) for directing the at least one beam in a first direction at least substantially radially outwardly of and away from the predetermined axis of the carrier, first deflecting means (such as one or more stationary mirrors) which is arranged to change the orientation of the directed beam at a location radially outwardly of the peripheral portion in a second direction which is at least substantially parallel to the predetermined axis and is radially outwardly adjacent successive articles at the peripheral portion of the carrier, and second deflecting means (e.g., a set of diverting mirrors) arranged to change the orientation of the beam from the second direction into a third direction at least substantially toward the predetermined axis and against the envelopes of articles being borne by the peripheral portion of the carrier.

The improved apparatus preferably further comprises means for influencing the at least one beam between the radiation source and the directing means so that the beam impinges upon the directing means while advancing at least substantially at right angles to the predetermined axis. Such influencing means can comprise at least one cylinder lens which is arranged to focus the at least one beam upon a line coinciding at least substantially with the predetermined axis. The cylinder lens of the influencing means is or can be stationary.

The apparatus can also comprise means (e.g., a set of spherical lenses) for focussing the at least one beam being propagated in the third direction at at least one at least substantially fixed point which is located at the envelopes of articles being supported at the periphery of and being moved sideways by the rotary carrier.

As already mentioned hereinbefore, the means for directing the at least one beam at least substantially radially outwardly of and away from the predetermined axis can include a polygonal mirror, and such mirror is arranged to rotate about a second axis which is at least substantially parallel with the predetermined axis and is provided with facets arranged to direct the at least one beam across and about the predetermined axis. The carrier can be arranged to rotate about the predetermined axis in a first direction, and the mirror can be arranged to rotate about the second axis in a second direction counter to the direction of rotation of the carrier. At least one optical component can be provided in the path of the at least one beam from the predetermined axis toward the first deflecting means; the focus of such at least one optical component is or can be located on a line which at least substantially coincides with the predetermined axis, and such optical component can include a cylinder lens which is arranged to transform pivotal movements of the at least one beam about the predetermined axis into a parallel shifting of the at least one web. The cylinder lens is or can be stationary, and such apparatus can further comprise means for focussing the beam being propagated in the third direction at a plurality of at least substantially fixed focal points which are located at the envelopes of articles being supported at the periphery of and being moved sidewise by the carrier. The focussing means and the at least one optical component can be constructed and arranged to cooperate in such a way that the focussing means effects a parallel shifting of the at least one beam and the focal points constitute a series of points, as seen in the direction of rotation of the carrier. For example, the focussing means can be arranged to establish five focal points and the radiation source can include means for interrupting the emission of the at least one beam between the focal points of the series. The number of facets on the polygonal mirror can be selected in such a way that, while impinging upon any one of such facets, the at least one beam is caused to turn about the predetermined axis through a predetermined angle; for example, the mirror can comprise eight facets and the aforementioned angle can match or approximate 90°.

The improved apparatus can further comprise five optical components which are located in the path of the at least one beam from the predetermined axis toward the first deflecting means, and such optical components can include a series of discrete cylinder lenses which are located in the path of propagation of the at least one beam in the first direction toward the first deflecting means. The directing means of such apparatus can include the aforementioned rotary mirror which has a plurality of facets arranged to direct the at least one beam upon discrete cylinder lenses, and such cylinder lenses have foci on a line which at least substantially coincides with the predetermined axis. The radiation source of such apparatus can include means for interrupting the emission of the at least one beam between impingements of the at least one beam upon successive lenses of the series of discrete cylinder lenses.

If the apparatus includes directing means comprising a polygonal mirror which is arranged to rotate about the aforementioned second axis that is at least substantially parallel to the predetermined axis, the facets of such mirror can be arranged to direct the at least one beam across and to turn the at least one beam about the predetermined axis, and the mirror can be arranged to return the at least one beam back to a starting position during each transition from directing the beam by one of the facets to directing the beam by another of the facets. The radiation source can include or cooperate with means for turning off the at least one beam at each return to the starting position.

The improved apparatus is or can be set up to perforate tubular envelopes of articles which are spaced apart from each other at the peripheral portion of the carrier. The number of facets on the polygonal mirror of the directing means, the speeds of rotation of the carrier and of the polygonal mirror about the respective axes, the length of the peripheral portion of the carrier and the spacing between the articles at the peripheral portion of the carrier can be related to each other in such a way that, during directing of the at least one beam by one of the facets, the at least one beam impinges upon and perforates the envelopes of selected articles at the peripheral portion of the carrier and the envelopes of other articles at the peripheral portion of the carrier are perforated during impingement of the at least one beam upon another facet of the polygonal mirror following the one facet, as seen in the direction of rotation of the mirror about the second axis. The selected articles can include the first, third, fifth, etc. articles at the peripheral portion of the carrier. Such apparatus can further comprise means for focussing the beams being propagated in the third direction at at least one at least substantially fixed point which is located at the envelopes being supported at the periphery of and being moved by the carrier. The relationship between the number of facets, the speeds of the carrier and the facetted mirror, the length of the peripheral portion of the carrier and the spacing between the articles can be such that the envelopes which are not perforated during directing of the at least one beam by the one facet are perforated not earlier than upon the start of the next-following movement of the at least one beam and not later than upon arrival of the respective articles at the focal points of focussing means which were employed to focus the at least one beam upon the envelopes of articles immediately preceding the articles having envelopes already perforated by the at least one beam during directing of the at least one beam by the one facet. The aforementioned relationship can be such that the envelope of each article is perforated only when the envelope portion to be perforated is located at the at least one at least substantially fixed point at which the at least one beam is focussed by the focussing means.

The apparatus can further comprise means for rotating the articles about their longitudinal axes and relative to the peripheral portion of the carrier through an angle of n×360°. For example, the articles can be rotated about their longitudinal axes through angles of 360° or 1080°. This renders it possible to provide each envelope with perforations at a plurality of locations at the circumferences of the articles.

The radiation source can be arranged to emit at least two at least substantially parallel beams each of which is arranged to provide perforations in the envelopes of articles at the peripheral portion of the carrier. The second deflecting means of such apparatus can be arranged to direct the at least two beams in at least slightly convergent third directions which are at least substantially normal to the peripheral portion of the carrier.

The single beam or at least one of plural beams can be arranged to have an at least substantially circular cross-sectional outline.

The first deflecting means of the improved apparatus can comprise at least one stationary mirror which is located radially outwardly of the peripheral portion of the carrier. The second deflecting means can also comprise at least one stationary mirror which is disposed radially outwardly of the peripheral portion of the carrier and is spaced apart from the first deflecting means.

The aforementioned means for focussing the beam or beams being propagated in the third direction at at least one substantially fixed point which is located at the envelopes of articles being supported at the periphery of and being moved sidewise by the carrier can comprise at least one spherical lens.

Another feature of the present invention resides in the provision of a method of perforating tubular envelopes of rod-shaped articles of the tobacco processing industry. The improved method comprises the steps of advancing a series of successive parallel articles sideways along an arcuate path, directing at least one beam of radiation—having energy sufficient to perforate the envelopes—from an axis of the path at least substantially radially outwardly toward and beyond the path, thereupon deflecting the at least one beam in at least substantial parallelism with the axis and radially outwardly of the path, and thereafter diverting the at least one deflected beam at least substantially radially inwardly toward the envelopes of articles in the path.

The directing step can include advancing the at least one beam at least substantially at right angles to the axis. Such directing can involve focussing the at least one beam upon a line which at least substantially coincides with the axis.

The method can further comprise the step of focussing the diverted beam upon at least one point on the envelopes of the articles in the path to thus perforate the envelopes.

The directing step can include pivoting the at least one beam about the axis, and the advancing step of such method can include moving the articles along the arcuate path in one of two directions including clockwise and counterclockwise; the step of pivoting the at least one beam about the axis then preferably includes moving the at least one beam in the other of the two directions. The pivoting step can include repeatedly pivoting the at least one beam through one of a plurality of angles including at least 35° and at least 90°. The repeated pivoting can include directing the at least one beam against and through a plurality of discrete optical components having foci on a line which at last substantially coincides with the axis. The number of such discrete optical elements is at least two, preferably at least five. Such method can further comprise the step of temporarily turning off the at least one beam between repeated pivotings against and through the plurality of optical components.

The method can further comprise the step of imaging the at least one beam by at least one optical element while the at least one beam is being directed from the axis of the aforementioned path; the focus of such at least one optical element can be located on a line which at least substantially coincides with the axis. This method can also comprise the step of causing the at least one optical element to convert a pivotal movement of the at least one beam into a parallel shifting of such beam and the steps of focussing the parallel shifted beam upon a plurality of successive focal points located on the envelopes of articles advancing sideways along the arcuate path. The number of such focal points can be between two and five, and such focal points can be elongated. Still further, the just discussed embodiment of the method can comprise the step of temporarily turning off the at least one beam between the focussing steps.

The directing step of the improved method can include the aforementioned pivoting of the at least one beam about the axis of the path through a predetermined angle in a first direction from a starting position, and thereupon pivoting the at least one beam about the axis through the predetermined angle in a second direction counter to the first direction and back to the starting position. Such embodiment of the method can also comprise the step of temporarily turning off the at least one beam at least during pivoting in the second direction.

In accordance with a modification, the directing step includes repeatedly pivoting the at least one beam about the axis of the path through a predetermined angle which is sufficient to ensure perforation of the envelopes of first, third, etc. articles of the series during a first pivoting of the at least one beam and to perforate the envelopes of second, fourth, etc. articles during a next-following pivoting of the at least one beam.

If the directing step includes repeatedly pivoting the at least one beam about the axis of the path through a predetermined angle, such method can further comprise the step of focussing the diverted at least one beam upon the envelopes of alternate articles in the aforementioned path, particularly of focussing the at least one beam upon the envelopes of those articles in the path whose envelopes were not perforated during the preceding pivoting of the at least one beam. The focussing step can include resort to sets of lenses which are located in the path of the diverted beam.

The improved method can also include the step of focussing the diverted at least one beam upon the envelopes of articles in the path by way of a plurality of stationary lenses.

Still further, the improved method can include the steps of rotating the articles about their longitudinal axes through angles of at least 360° in the course of the diverting step, and focussing the at least one beam upon the articles while the articles rotate about their respective longitudinal axes. The rotating step can include turning the articles about their longitudinal axes through several revolutions.

The directing, deflecting and diverting steps can include resort to at least two beams, e.g., two laser beams furnished by a CO2 laser. The diverting step of such method can include propelling the at least two beams toward the envelopes of articles in the aforementioned path along discrete at least slightly convergent paths.

The at least one beam or at least one of several beams can have an at least substantially circular cross-sectional outline.

The novel features which are considered as characteristic of the invention are set forth in particular in the appended claims. The improved apparatus itself, however, both as to its construction and the modes of assembling and utilizing the same, together with numerous additional important and advantageous features and attributes thereof, will be best understood upon perusal of the following detailed description of certain presently preferred specific embodiments with reference to the accompanying drawing.

DESCRIPTION OF PREFERRED EMBODIMENTS

Figure 1:
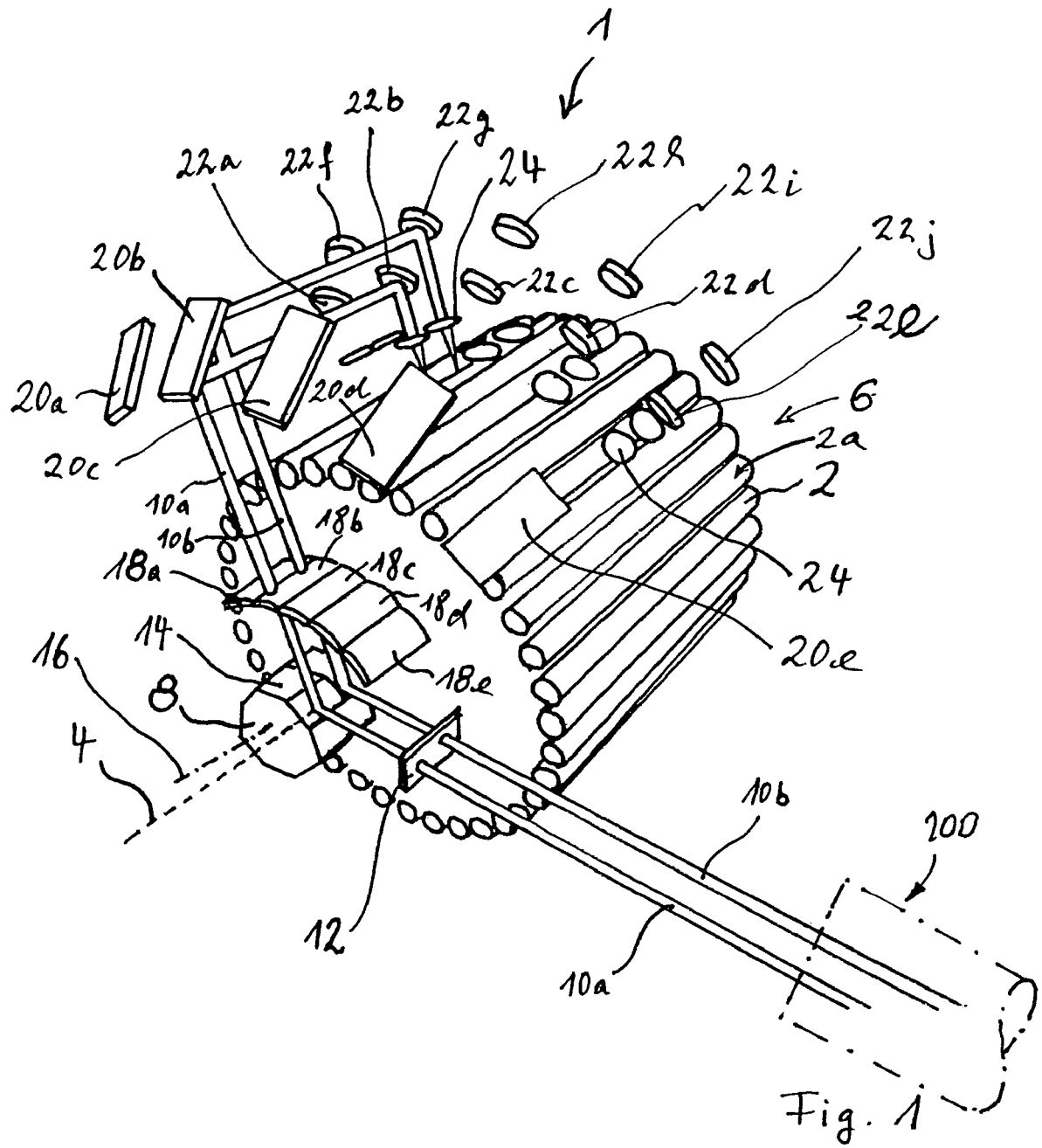
FIG. 1 is a schematic perspective view of certain constituents of a perforating apparatus which employs a CO2 laser for the emission of two beams and embodies one form of the present invention.

FIG. 1 shows a portion of an apparatus 1 which embodies one presently preferred form of our invention and is designed to make perforations in (i.e., to alter the permeability of) the tubular envelopes or wrappers of elongated rod-shaped smokers' articles or products 2 (hereinafter also called cigarettes or filter cigarettes for short but with the understanding that such apparatus can be utilized with equal or similar advantage for changing the permeability of tubular envelopes or wrappers forming part of other smokers' products or component parts (such as filter mouthpieces) of smokers' products).

The apparatus 1 comprises a drum-shaped carrier 6 which is arranged to rotate counterclockwise (as viewed in FIG. 1) about its central longitudinal axis 4 and has a peripheral surface provided with axially parallel preferably equidistant flutes or analogous or similar receptacles for portions of the articles 2. It will be seen that the articles 2 are caused to move sideways (i.e., at right angles to their central longitudinal axes) when the carrier 6 is caused to turn about the axis 4. This carrier receives successive articles 2 from a rotary drum-shaped fluted article-supplying conveyor 5 (see FIGS. 4 and 5) and delivers successive treated (perforated) articles to a rotary drum-shaped fluted article-receiving conveyor 7 (also shown in FIGS. 4 and 5).

Figure 3:
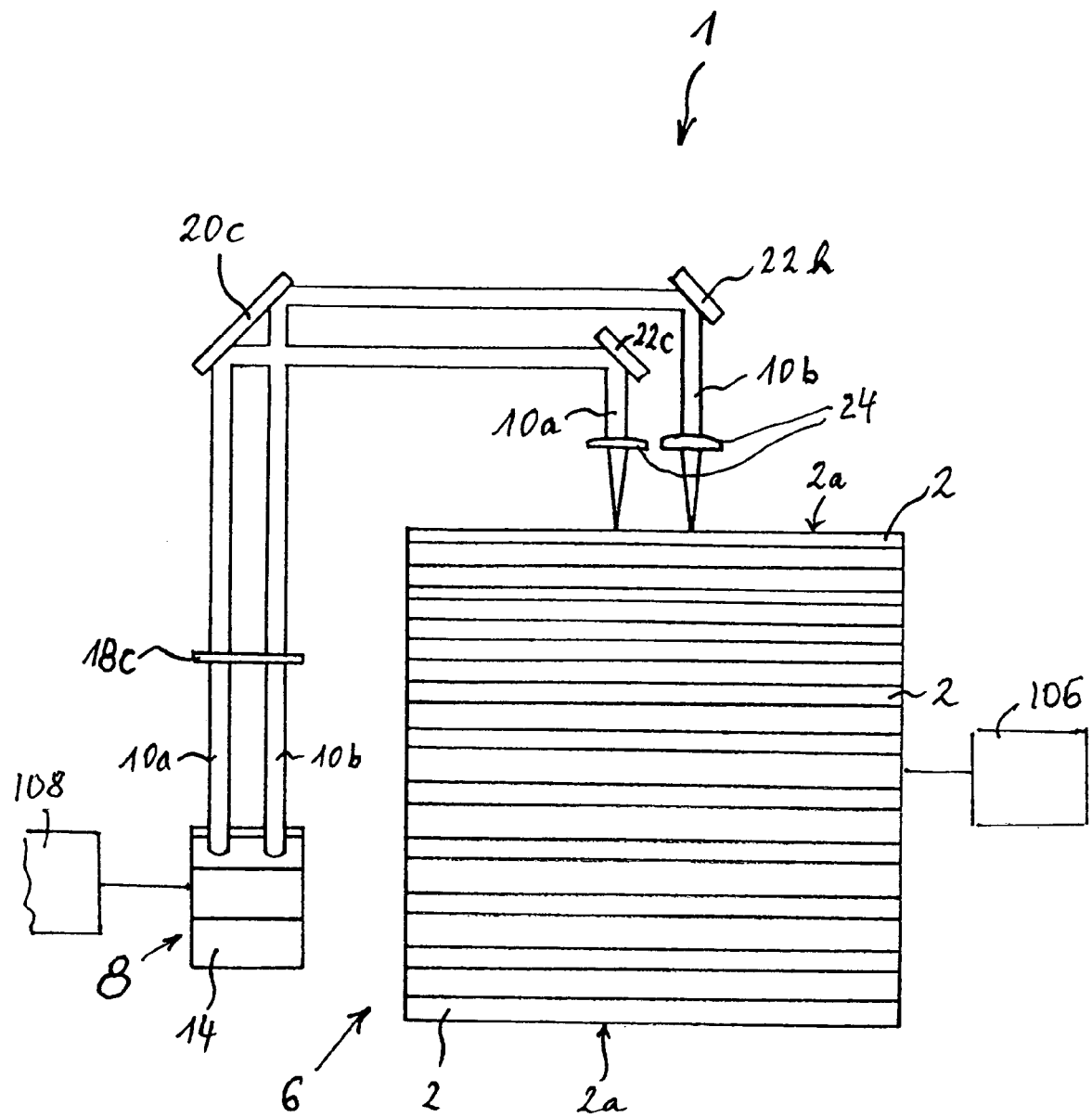
FIG. 3 is a slightly enlarged side elevational view of certain parts of the apparatus which is shown in FIG. 1.

The apparatus 1 further comprises a polygonal laser beam directing or orienting mirror 8 which serves to deflect (orient) two parallel pulsating laser beams 10a, 10b issuing from a suitable source 100, e.g., a CO2 laser of the type disclosed, for example, in commonly owned U.S. Pat. No. 4,889,140 granted Dec. 26, 1989 to Lorenzen et al. for "APPARATUS FOR MAKING PERFORATIONS IN ARTICLES OF THE TOBACCO PROCESSING INDUSTRY". The mirror 8 has a plurality of facets 14 (FIG. 1 shows eight identical facets) which are arranged to direct the beams 10a, 10b substantially radially outwardly, i.e., radially of and away from the axis 4 and beyond the periphery of the carrier 6. The means 106 for rotating the carrier 6 about the axis 4 and the means 108 for rotating the mirror 8 about its axis 16 (which is parallel to the axis 4) are shown in FIG. 3. The position of the axis 16 relative to the axis 4 is selected substantially in such a way that the facets 14 of the polygonal mirror 8 are caused to orbit along a path essentially crossing the axis 4. The mirror 8 is arranged to rotate clockwise, i.e., counter to the direction of rotation of the carrier 6.

The CO2 laser 100 constitutes one presently preferred source of pulsating beams 10a and 10b. FIG. 1 shows that, in the apparatus 1, the beam 10a is located in front of the beam 10b. On their way from the laser 100 to the facets 14 of the mirror 8, the beams 10a, 10b advance through a beam influencing means here shown as a first stationary cylinder lens 12 which serves to focus the beams upon a line essentially coinciding with the axis 4 of the drum-shaped carrier 6. Thus, the facets 14 are rotatable through the focus of the first cylinder lens 12.

The apparatus 1 of FIG. 1 further comprises five optical components 18a, 18b, 18c, 18d, 18e which constitute cylinder lenses and serve to image the beams 10a, 10b upon deflection of such beams by the facets 14 of the rotary polygonal mirror 8. These optical components are arranged to jointly form an arcuate array of lenses and are installed at the same distance from the axis 4. The configurations and the positions of the optical components 18a to 18e are selected in such a way that they convert the pivotal movements of the beams 10a, 10b (caused by rotation of the polygonal mirror 8 about the axis 16) into a parallel shifting of the beams along the surfaces of the cylinder lenses 18a to 18e. These lenses cover those ranges (here 90°) of pivotal movements of the beams 10a, 10b which are caused by the facets 14 of the polygonal mirror 8.

Each of the cylinder lenses 18a to 18e cooperates with one of five stationary first beam deflecting means 20a to 20e each of which is a mirror inclined at an angle of 45° to the peripheral surface of the drum-shaped carrier 6 and spaced apart radially outwardly from such peripheral surface. The purpose of the first deflecting mirrors 20a to 20e is to deflect or direct the beams 10a, 10b in directions at least substantially parallel to the axis 4 and in such a way that the thus deflected beams are spaced apart radially outwardly from the peripheral surface of the carrier 6.

The beams 10a, 10b which are deflected by the first deflecting mirrors 20a to 20e respectively impinge upon and are deflected radially inwardly toward the articles 2 at the periphery of the carrier 6 by a second set of stationary deflecting mirrors 22a to 22j which are spaced apart from the mirrors 20a to 20e, as seen in the direction of the axis 4. The mirrors 22a to 22e serve to deflect the laser beam 10a radially (or at least substantially radially) inwardly toward the articles 2 on the rotating carrier 6, and the mirrors 22f to 22j perform a similar function in connection with the beam 10b.

The characters 24 denote in FIG. 1 several spherical focussing lenses which are installed between the second deflecting mirrors 22a to 22j and the periphery of the drum-shaped carrier 6 and serve to focus the radially inwardly propagated laser beams 10a, 10b upon the tubular wrappers or envelopes of the articles 2. These spherical lenses 24 are disposed in pairs, one for each set of two of the second deflecting mirrors 22a to 22j, and their purpose is to focus the beams 10a, 10b upon spatially fixed focal points at the envelopes of the articles 2. These spherical lenses 24 and their foci are located and selected in such a way that the articles 2 must advance through these foci and are thus provided with one or more perforations at selected portions of their wrappers.

The operation of the apparatus 1 which is shown in FIG. 1 is as follows:

The $CO_2$ laser 100 (or an equivalent thereof) furnishes the laser beams 10a, 10b which impinge upon the stationary beam influencing cylinder lens 12 serving to focus the beams upon a line which coincides essentially with the axis 4 of the drum-shaped carrier 6.

That facet 14 of the polygonal directing or orienting mirror 8 which is located at the focus of the cylinder lens 12 projects the laser beams 10a, 10b upon one of the five optical components (cylinder lenses) 18a to 18e. In FIG. 1, the angular position of the mirror 8 is such that the beams 10a, 10b impinge upon the cylinder lens 18b. The purpose of the lenses 18a to 18e is to cause a parallel shifting of the beams 10a, 10b along the surfaces of such lenses; in FIG. 1, the shifting is caused by the lens 18b which is located in the paths of propagation of the beams 10a, 10b being deflected by one of the facets 14 on the rotating polygonal mirror 8. The rotational speed of the mirror 8, and hence the speed of movement of the beams 10a, 10b along the cylinder lenses 18a to 18e, are related to the on/off frequency of the pulsating beams 10a, 10b in such a way that, during deflection by one of the lenses 18a to 18e, these beams are repeatedly (five times in the embodiment of FIG. 1) turned on for periods of time which suffice to provide the envelope or wrapper of an article 2 with a corresponding number of perforations (shown in FIGS. 6 and 7, as at 30). The laser 100 is turned off (i.e., it interrupts the transmission of beams 10a, 10b) during transition from impingement of the beams 10a, 10b upon one of the cylinder lenses 18a to 18e to impingement upon the next one.

Since the polygonal mirror 8 of FIG. 1 comprises a total of eight facets 14, each of the facets 14 changes the orientation of the beams 10a, 10b clockwise through 90° during each revolution of the mirror 8.

As already mentioned hereinbefore, the first deflecting mirrors 20a to 20e divert the laser beams 10a, 10b coming from the cylinder lenses 18a to 18e through angles of substantially 90° so that these beams propagate themselves radially outwardly of and in at least substantial parallelism with the axis of the drum-shaped article carrier 6. The beam 10a which is diverted by the first deflecting mirrors 20a to 20e impinges upon and is reoriented by the second deflecting mirrors 22a to 22e so that this beam advances at least substantially radially inwardly toward the articles 2 in the peripheral flutes of the carrier 6. FIG. 1 shows that situation when the laser beam 10a is deflected by the mirror 20b and thereupon by the mirror 22g. The other laser beam 10b is deflected by the mirrors 20a to 20e and thereupon by the mirrors 22f to 22j; in FIG. 1, the beam 10b is deflected by the mirrors 22b and 22g.

The beams 10a, 10b which are deflected by the mirrors 20a to 20e and thereupon by the mirrors 22a to 22e and 22f to 22j respectively advance radially inwardly toward the axis 4 and are focussed, by the spherical lenses 24, upon the external (peripheral) surfaces 2a of tubular wrappers forming part of the rod-shaped smokers' articles 2 which are advanced sideways by the carrier 6.

In the positions which the carrier 6, the mirror 8 and the articles 2 assume in FIG. 1, the laser beams 10a, 10b issuing from the radiation source 100 advance through the beam influencing cylinder lens 12 and impinge upon one facet 14 of the rotary mirror 8 which directs the beams upon the cylinder lens 18b. The latter directs the beams 10a, 10b upon the deflecting mirror 20b which directs the beam boa against the mirror 22b and the beam 10b against the mirror 22g. The mirrors 22b and 22g direct the beams 10a, 10b against two of the spherical lenses 24. Since the polygonal mirror 8 rotates about its axis 16, the angles of impingement of laser beams 10a, 10b upon one of the eight facets 14 of the mirror vary in such a way that the two beams change their orientation through angles of 90° and are influenced by all of the cylinder lenses 18a to 18e and hence also by all of the first deflecting mirrors 20a to 20e, by all of the second deflecting mirrors 22a to 22j, and all of the cylindrical lenses 24 to thus perforate seriatim the wrappers of the articles 2 which are being advanced past the spherical focussing lenses 24.

Figure 2:
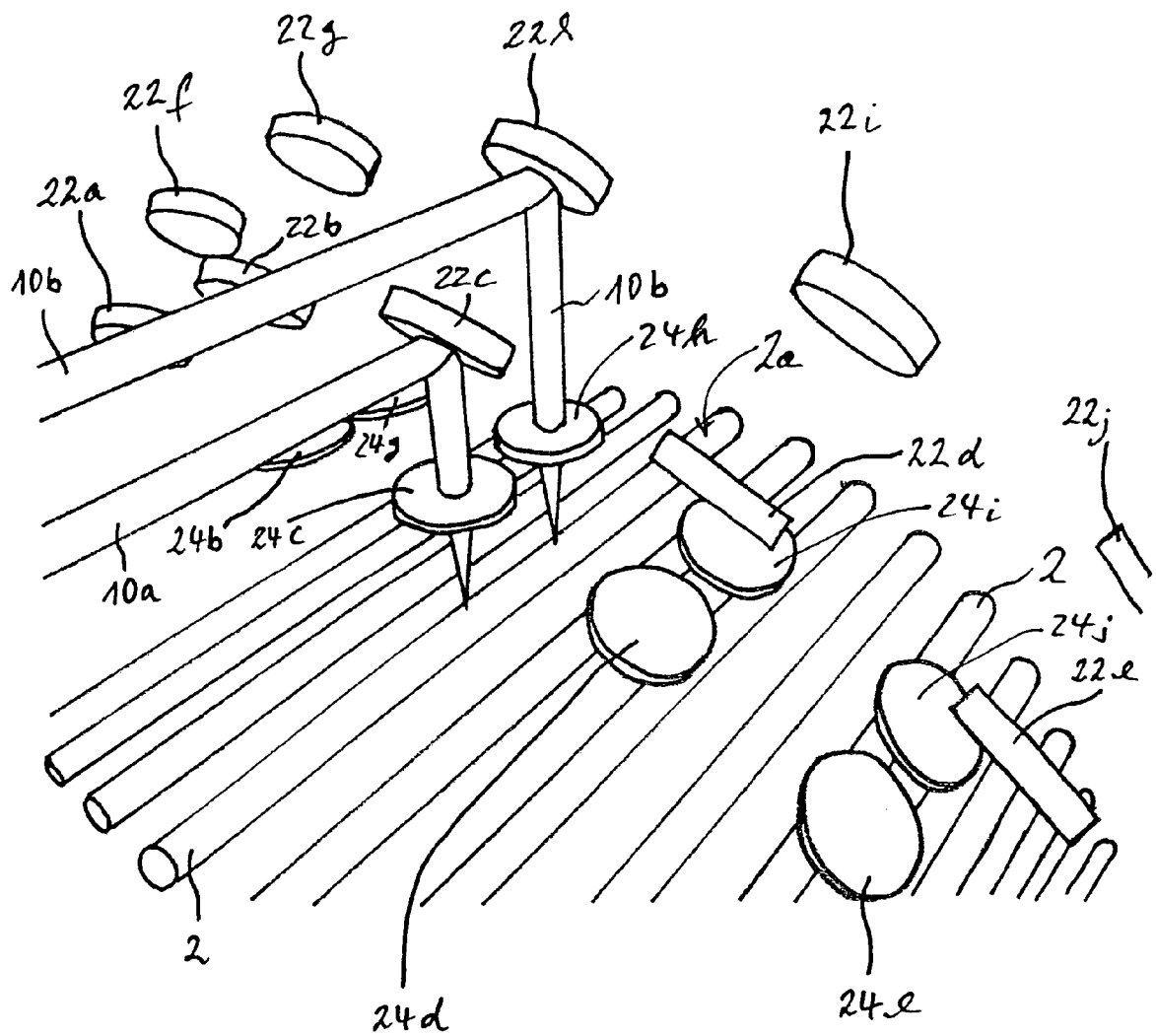
FIG. 2 is an enlarged view of a detail in the apparatus of FIG. 1.

FIG. 2 illustrates, drawn to a larger scale, a next following stage of operation of the apparatus 1, i.e., subsequent to a certain angular movement of the carrier 6 (not shown) and the mirror 8 (not shown) beyond the positions shown in FIG. 1. The laser beams 10a, 10b respectively impinge upon and are deflected by the mirrors 22c, 22h which direct these beams against the spherical lenses 24c, 24h, respectively. The beams 10a, 10b are deflected clockwise beyond the positions of FIG. 1, and such deflection is effected by the cylinder lens 18c and mirror 20c which are not shown in FIG. 2. The lenses 24c, 24h focus the respective beams 10a, 10b upon the external surface 2a of the adjacent article 2; this results in the making of perforations.

FIG. 3 shows the carrier 6 and the mirror 8 in a side elevational view. The laser beams 10a, 10b are deflected by one facet 14 of the mirror 8 and thereupon by the lens 18c and mirror 20c to respectively impinge on the mirrors 22c, 22h on their way toward two spherical lenses 24 and thence toward the envelope 2a of one of the articles 2 on the carrier 6.

Figure 4:
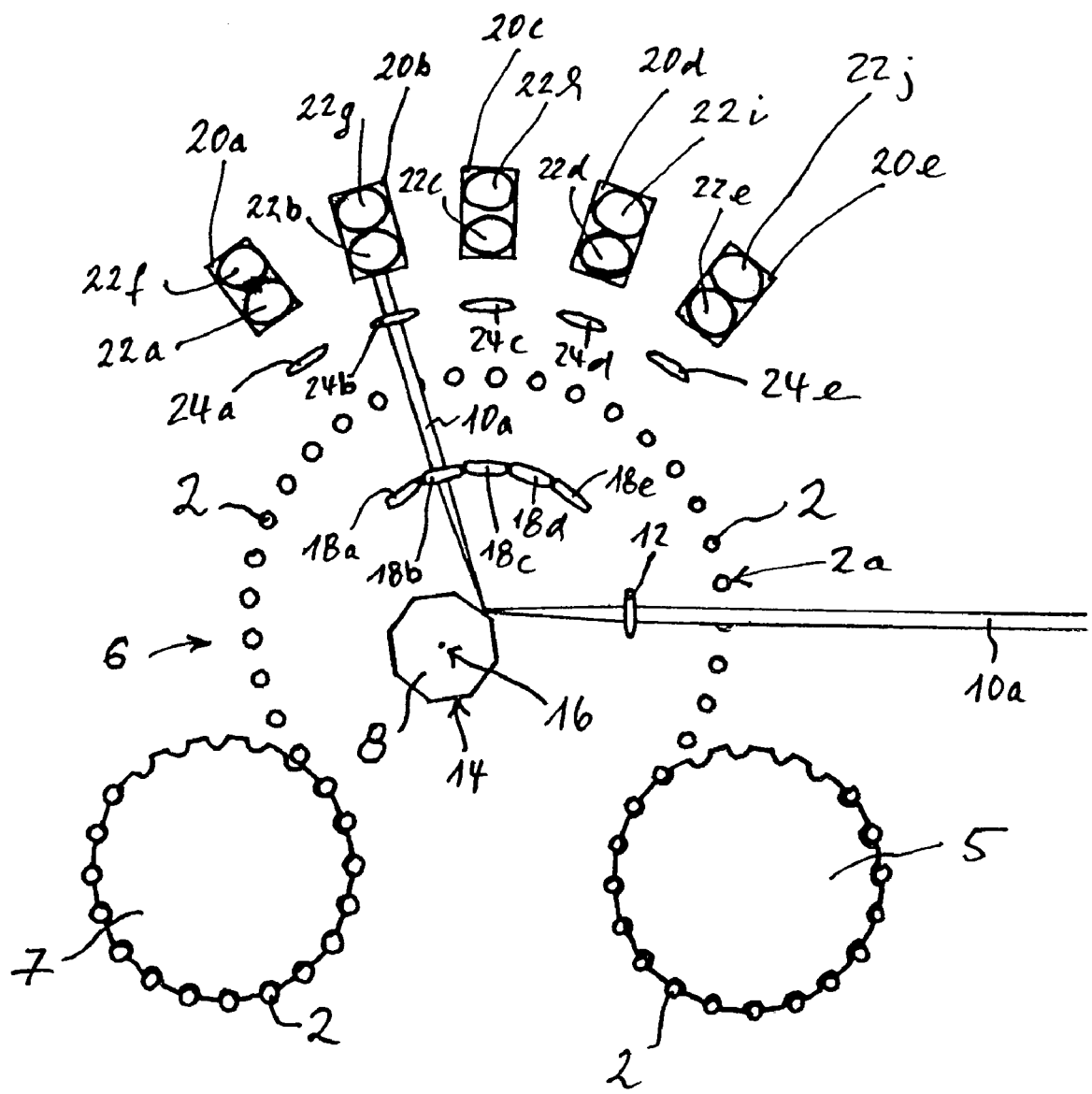
FIG. 4 is a front elevational view of certain parts of the apparatus and further shows means for supplying untreated rod-shaped articles to and means for receiving treated articles from the article carrier of FIG. 1.

FIG. 4 is a front elevational view of the apparatus 1 of FIG. 1 with a series of articles 2 at the periphery of the carrier 6 (only the locus of this carrier is indicated in FIG. 4). The orientation of the beams 10a, 10b (only the beam 10a can be seen) is the same as in FIG. 1.

Figure 5:
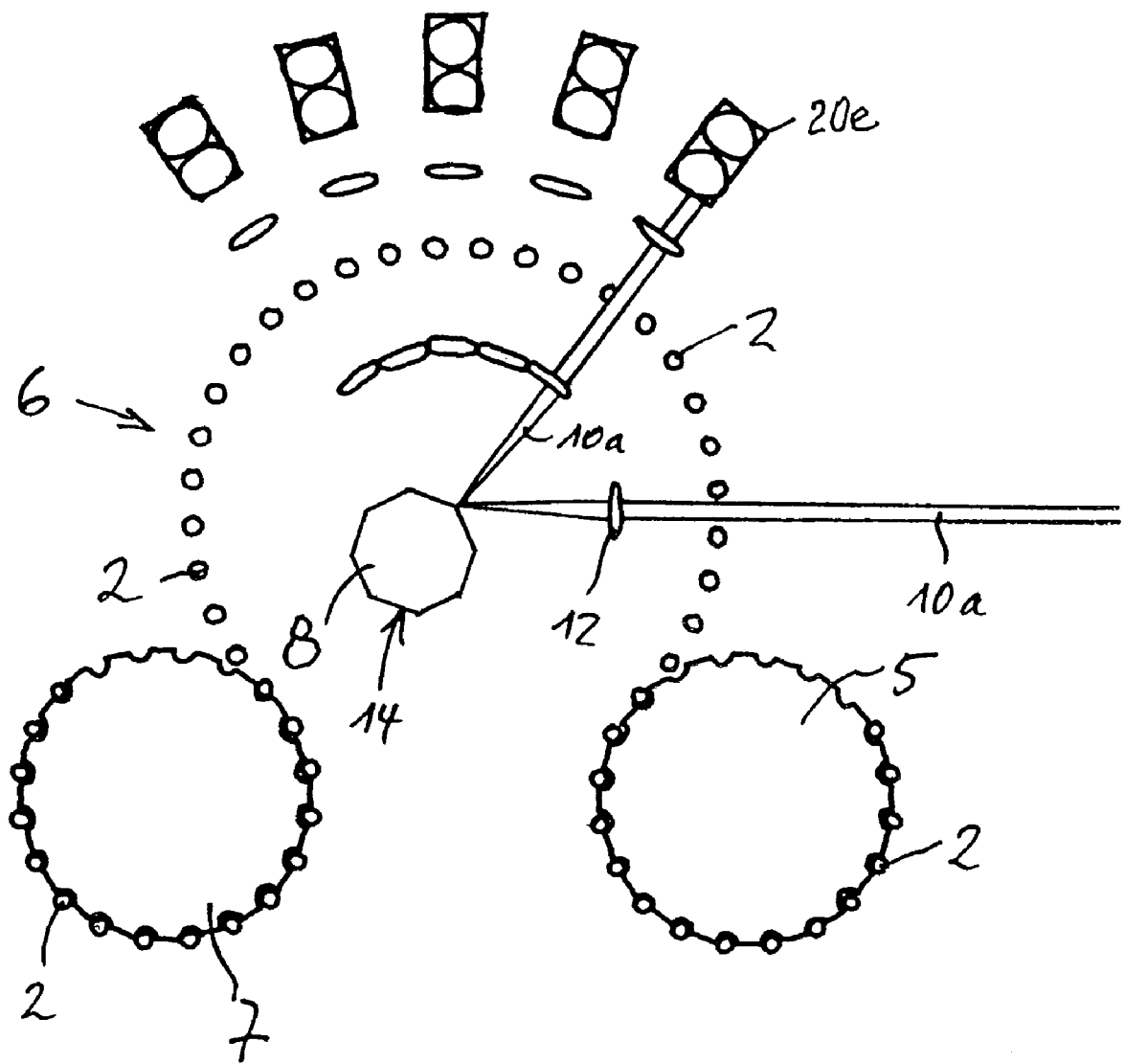
FIG. 5 shows the structure of FIG. 4 but with the polygonal mirror of the beam directing means in a different angular position.

FIG. 5 illustrates a stage of operation of the apparatus 1 which follows the stage shown in FIG. 2. The angular position of the polygonal mirror 8 is such that the laser beams 10a, 10b impinge upon the marginal portion of that facet 14 of the mirror 8 which directs the beams against the deflecting mirror 20e, i.e., the mirror 8 has been caused to turn clockwise beyond the angular position of FIG. 2. If the mirror 8 is caused to turn clockwise beyond the angular position of FIG. 5, the beams 10a, 10b impinge upon the next-following facet 14 of this mirror. Since the next-following facet 14 makes a smaller angle with the paths of the beams 10a and 10b, these beams jump backwards (counterclockwise) through 90° relative to the positions shown in FIG. 5 while te mirror 8 turns in such a way that the beams impinge upon the next-following mirror 14.

Figure 6:
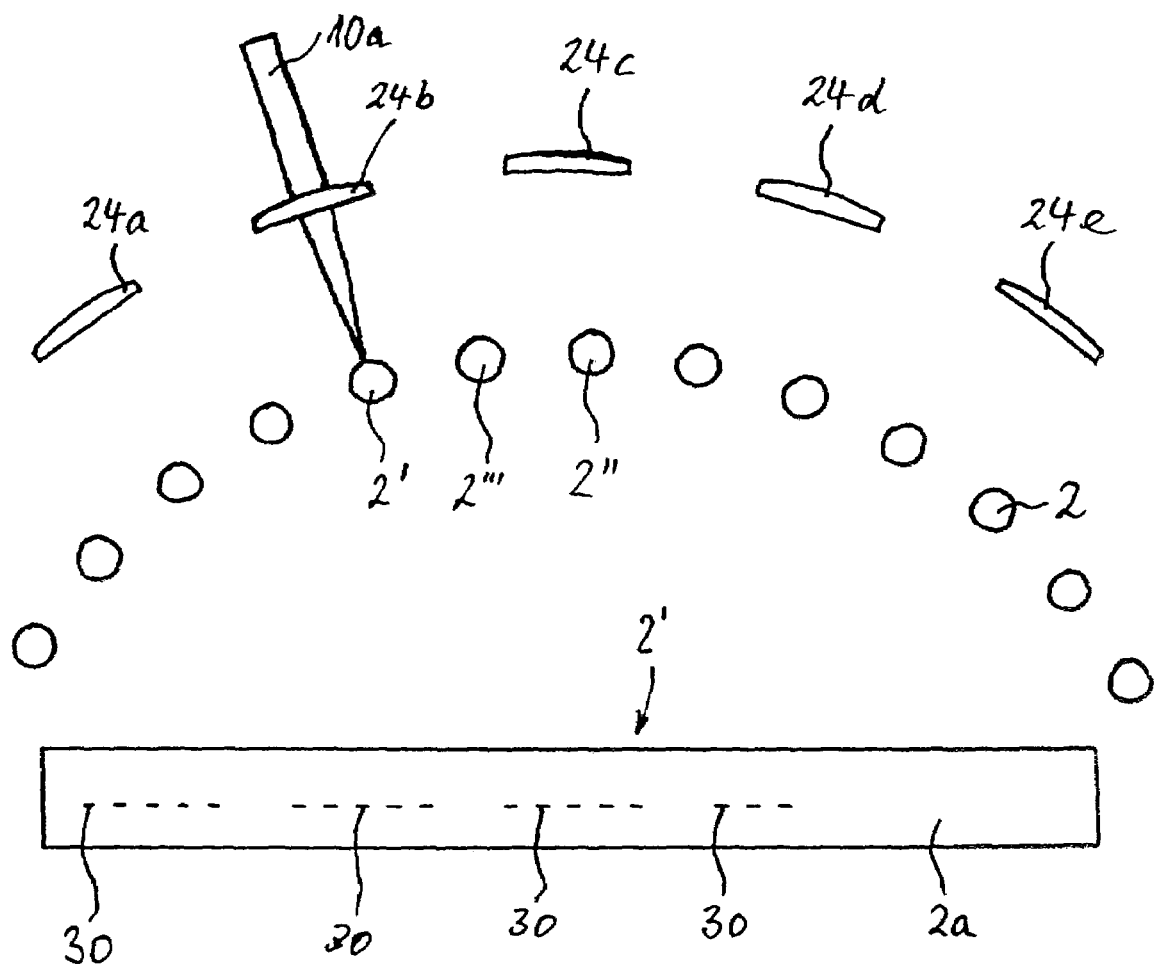
FIG. 6 is an enlarged view of a portion of the structure which is shown in FIG. 4.
Figure 7:
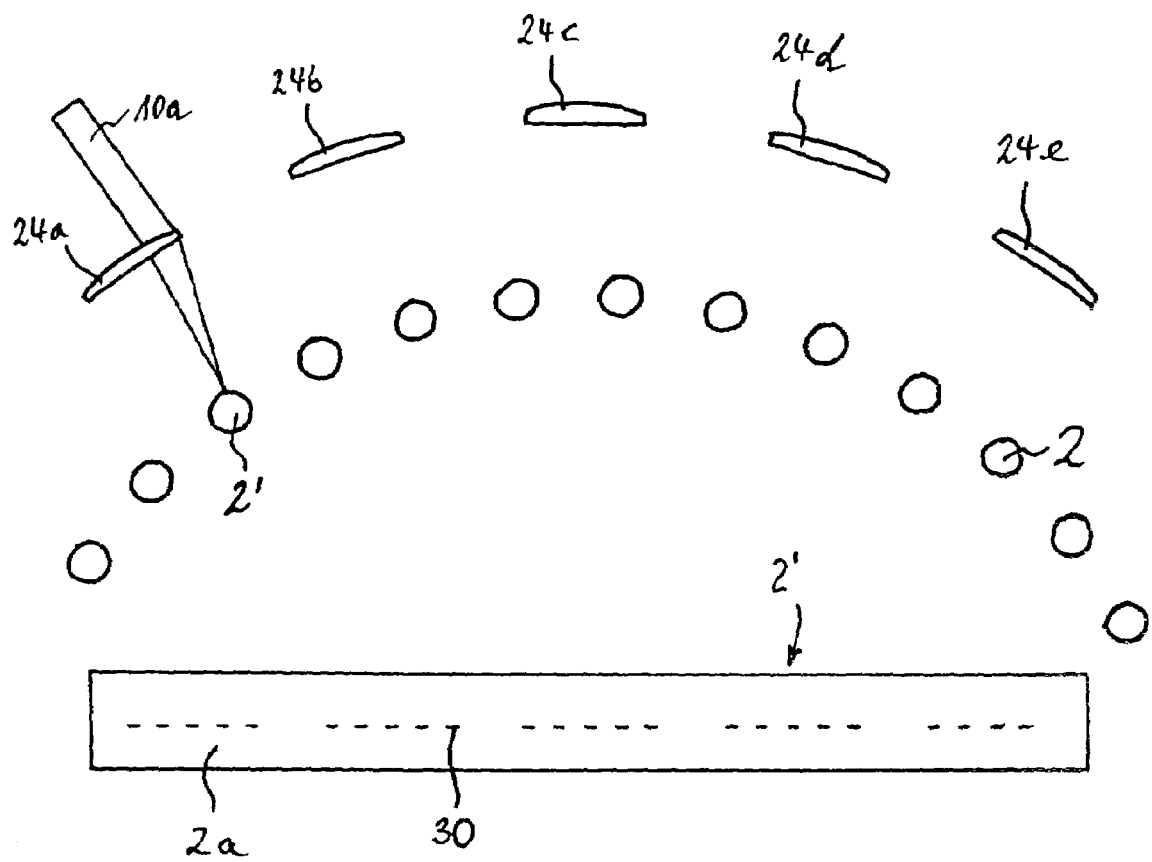
FIG. 7 shows the structure of FIG. 6 but with one of the laser beams in a different position.

A perusal of FIGS. 6 and 7 will facilitate an even more accurate interpretation of the mode of operation of the apparatus 1. The median part of each of these Figures illustrates a series of parallel articles 2, 2', 2", 21''', . . . which are assumed to be located at the periphery of the drum-shaped rotary carrier 6 (not shown in FIGS. 6 and 7). The arcuate path wherein the articles move sideways is adjacent to the spherical lenses 24a to 24e which are shown in FIGS. 6 and 7. The lower part of each of these Figures shows a rod-shaped article 2 and its envelope 2a, namely the article the tubular wrapper of which is being perforated by the beam, 10a. The envelope 2a is shown in a condition prior to conversion into a tubular wrapper, i.e., it can constitute a flat strip of cigarette paper, tipping paper or the like. The characters 30 denote rows of perforations in the envelope 2a.

The angle at which the laser beam 10a of FIG. 6 impinges upon the spherical lens 24b is the same as in FIG. 1, i.e., this beam reaches seriatim a facet 14 of the mirror 8, the first deflecting mirror 20b, the second deflecting mirror 22b and thereupon the spherical lens 24b. At such time, the rod-shaped article 2' of FIG. 6 has already advanced beyond the focal points of the lenses 24e, 24d, 24c which are associated with the respective mirrors 22e, 22d and 22c. Due to parallel shifting of the laser beam 10a caused by the cylinder lenses 18e, 18d, 18c (this laser beam is turned on five times during each stage of operation of the apparatus 1), the peripheral surface 2a of the wrapper on the article 2' is already provided with three sets of five perforations 30 each, namely with five perforations during each of those intervals when the beam 10a is being influenced by the lenses 24e, 24d and 24c.

When those parts of the apparatus 1 which are shown in FIG. 6 assume the positions shown in this Figure, the article 2' is disposed beneath (i.e., in operative position relative to) the fourth spherical lens 24b (as seen in the direction of rotation of the drum-shaped carrier 6). At such time, the laser beam 10a is also located in the position shown in FIG. 6 because the rotational speed of the carrier 6, the rotational speed of the polygonal laser beam orienting mirror 8, the number of facets 14 on the mirror 8, the distances between neighboring articles 2 (as seen in the circumferential direction of the carrier 6) and the peripheral length of the carrier 6 are related to each other in such a way that an article 2 is located beneath (as seen radially of the carrier 6) one of the spherical lenses 24a, 24b, 24c, 24d, 24e when the beam 10a impinges upon such one lens. Furthermore, the rotational speed of the carrier 6, the rotational speed of the mirror 8, the number of facets 14 on the mirror 8, the spacing between neighboring articles 2 at the periphery of the carrier 6 and the circumferential length of the carrier 6 are related to each other in such a way that each article 2 which is located in the path of propagation of a laser beam coming from one of the spherical lenses 24a, 24b, 24c, 24d, 24e is perforated once, i.e., such article is provided with five perforations 30, that is five times with five perforations each.

FIG. 6 shows that stage of operation of the apparatus 1 when the polygonal mirror 8 has changed the orientation of the laser beam 10a (in the region of the cylindrical lens 18b) in such a way that the cylinder lens 18b has changed the pivotal movement of the beam 10a into a parallel shifting movement which has already resulted in the making of three perforations 30 in the corresponding portion or section of the peripheral surface 2a of such article.

The laser beam 10a is thereupon further influenced by the cylinder lens 18b (as a result of angular movement of the polygonal mirror 8 and the conversion of such angular movement into a further parallel shifting of the beam by the cylinder lens 18b in a direction to the right, as viewed in FIG. 6) to thus provide the peripheral surface 2a (i.e., the tubular wrapper or envelope 2a of the article 2') with two additional perforations 30 next to and properly spaced apart from the array of three perforations shown in the right-hand portion of the enveloper 2a depicted in FIG. 6.

The article 2' continues to move sideways (clockwise, as viewed in FIG. 6) and advances beyond the range of the cylindrical lens 24b. At the same time, the laser beam 10a is also advanced clockwise beyond the range of the spherical lens 24b of FIG. 6 (such advancement is caused by the mirror 8) so that it impinges upon the next spherical lens 24c and begins to perforate the tubular wrapper of the article 2".

The wrapper of the article 2''' between the articles 2' and 2" shown in FIG. 6 reaches the operative position relative to the spherical lens 24b when the laser beam 10a had already impinged upon the lens 24e (under the influence of the polygonal mirror 8 as a result of clockwise angular displacement) to be influenced by the next facet 14 of this mirror and to assume (by moving counterclockwise) a starting position in which (if not turned off) it would impinge upon the left-most part of the spherical lens 24a. Such beam is thereupon influenced by the cylinder lens 18a to move clockwise relative to the spherical lens 24a to a right-most position with reference to the optical element 24a. In order to shift from the rightmost position relative to the lens 24b, the beam 10a is turned off and is turned again when it reaches the just mentioned position relative to the lens 24b. As soon as the laser beam 10a reaches the spherical lens 24b, it proceeds with the perforating of the article 2'''. Thus, the envelope 2a of each article 2 is provided with five times five perforations by each of the laser beams 10a and 10b while such beams are influenced by the spherical lenses 24a to 24e.

The rod-shaped articles 2 are borne by the drum-shaped carrier 6 in such a way that they rotate about their respective longitudinal axes. This can be accomplished, by way of example, in a manner as disclosed and shown in German patent No. 35 101 19 C2 or in German patent No. 33 130 64 C2. Such rotary movements of the articles 2 relative to their carrier 6 ensure that a different section of the wrapper of each article is perforated while the laser beams are influenced by the spherical lenses 24a, 24b, 24c, 24d and 24e. The arrangement is preferably such that each of the articles 2 turns about its longitudinal axis through an angle at least approximating 360° (or a multiple thereof) during travel from the rotary supplying conveyor 5 to the rotary receiving or removing conveyor 7. All that counts is to ensure that each article 2 turns at least once about its longitudinal axis through an angle of at least close to 360° while it is being influenced by the laser beams 10a, 10b and while these beams are influenced by the lenses 24a to 24e. Such arrangement ensures that the perforations in the envelopes of all articles 2 form uniform patterns, e.g., at least in those portions of the envelopes which surround the filter mouthpieces. One such pattern is shown in FIGS. 6 and 7.

FIG. 7 shows that stage of treatment of the article 2' when the making of perforations 30 in its envelope 2a is almost completed. The laser beam 10a impinges upon the rightmost portion of the spherical lens 24a and is about to make the rightmost (fifth) perforation 30 in the rightmost group of five groups each of which contains five perforations 30 when the making of such perforations in the tubular envelope of the article 2' of FIG. 7 is completed.

An important advantage of the improved method and apparatus is that they avoid numerous serious disadvantages of presently known methods and apparatus including those of known apparatus described in the preceding passages of this specification. For example, it is not necessary (even though often preferred) to roll the articles 2 at the periphery of the rotating carrier 6 about their respective longitudinal axes between such carrier and a stationary block or the like. A further apparatus which can be utilized to turn cigarettes or the like around their longitudinal axes while the articles travel with a rotary drum-shaped conveyor or carrier is disclosed in commonly owned U.S. Pat. No. 4,825,882 granted May 2, 1989 to Hinz for "APPARATUS FOR ROLLING UNITING BANDS AROUND GROUPS OF ROD-SHAPED ARTICLES".

Furthermore, the improved apparatus can be utilized for the making of perforations in rod-shaped smokers' products of unit length or multiple unit length, for example, for the making of perforations in filter cigarettes of double unit length in the apparatus disclosed in commonly owned U.S. Pat. No. 5,135,008 granted Aug. 4, 1992 to Oesterling et al. for "METHOD OF AND APPARATUS FOR MAKING FILTER CIGARETTES". This is made possible because the improved apparatus embodies means for directing one or more beams of suitable radiation radially or substantially radially inwardly toward the envelopes 2a of articles 2,2', 2", . . . at the periphery of the rotary carrier 6.

The feature that the rotating means 106, 108 are caused to turn the carrier 6 and the polygonal mirror 8 in opposite directions contributes to simplicity and reliability of the improved method.

An advantage of the lenses 18a to 18e is that they ensure that the beams 10a, 10b impinge upon the first stationary deflecting mirrors 20a to 20e so that such beams can be caused to propagate themselves radially outwardly of the carrier 6 and in substantial parallelism with the peripheral portion of such carrier. This ensures that the two beams 10a, 10b can be caused to advance along discrete paths, that their (preferably circular or slightly oval) cross-sectional outlines are best suited for the making of satisfactory perforations 30, as well as satisfactory polarization.

The positions of the stationary focussing lenses 24a to 24j are selected in such a way that they further ensure the making of satisfactory perforations 30 at optimal locations of the envelopes or wrappers of the articles 2, 2', 2", etc. The relationship between the cylinder lenses 12' and 18a to 18e and other constituents of the improved apparatus 1 is preferably such that the parallel shifting of beams 10a, 10b which is effected by the lenses 18a to 18e enables the lenses 24a to 24j to effect the making of at least two but preferably five successive focal points. As already mentioned hereinbefore, the source 100 or another suitable part of the apparatus 1 interrupts the beams 10a, 10b between the focal points.

It is often desirable to select the relationship between the rotational speeds of the polygonal mirror 8 and of the drum-shaped carrier 6, the dimensions of the periphery of the carrier 6, the number of facets 14 on the mirror 8, the distances between neighboring articles 2, 2', 2", etc. as well as (if necessary) certain other parameters in such a way that, during each pivoting of a beam (e.g., the beam 10a) while it impinges upon one of the facets 14, perforations 30 are provided on the first, third, fifth, etc. articles of the series of articles on the carrier 6. The wrappers of the second, fourth, sixth, etc. articles are perforated during the next pivoting of such beam, i.e., by the next-following facet 14 of the polygonal mirror 8.

The just described relationship between the rotational speeds of the carrier 6 and mirror 8, the dimensions of the peripheral portion of the carrier 6 and other parameters is preferably such that the articles which are not perforated during a given pivoting of the beam (e.g., the beam boa) are perforated earliest at the start of the next pivoting of such beam and not later than upon arrival of the still not perforated articles into proper positions relative to the focussing lenses 24a to 24j) which were active in connection with the making of perforations in the envelopes of immediately preceding articles. The perforating operation upon a group of articles (such as 2, 2", . . . and 21, 2''', . . . ) should take place when the lenses 24a to 24j are in the process of focussing the beam or beams directly upon the envelopes or wrappers of the respective groups of articles.

The means for rotating the articles 2, 2', 2", etc. about their respective longitudinal axes while the articles advance with the carrier 6 is preferably designed in such a way that the perforating operation upon an article takes place while the latter turns through an angle of 360°, most preferably 3×360°, while such article is being supported by the carrier. The operation of the means for rotating the articles relative to the carrir 6 should be related to the operation of other component parts of the apparatus 1 in such a way that each beam is caused to turn about its axis of rotation through a pedetermined angle, such as the aforementioned angle of 360° or n×360° (wherein n is preferably three). This ensures that each of the selected focussing lenses 24a to 24j focusses the beam(s) upon different (predetermined) portions of the envelopes of the articles on the carrier 6. Such arrangement can ensure that the entire envelope (or a selected portion of each envelope) can be provided with uniformly or otherwise distributed perforations. The cross-sectional area of the beams 10a and/or 10b is or can be at least substantially circular. However, it is also possible, and often acceptable, to employ beams having an oval or substantially oval cross-sectional outline.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of changing the permeability of envelopes of rod-shaped smokers' products and, therefore, such adaptations should and are intended to be comprehended within the meaning and range of equivalence of the appended claims.

What is claimed is:

1. An apparatus for perforating tubular envelopes of rod-shaped articles of the tobacco processing industry, comprising:
    an at least substantially drum-shaped carrier rotatable about a predetermined axis and having a peripheral portion arranged to support a plurality of articles for sidewise movement about said axis;
    means for directing at least one beam of radiation in a first direction at least substantially radially outwardly of and away from said axis, the at least one beam of radiation being adapted to perforate the envelopes of articles borne by said carrier;
    first deflecting means arranged to change the orientation of the directed beam at a location radially outwardly of said peripheral portion in a second direction at least substantially parallel to said axis and radially outwardly of adjacent successive articles at the peripheral portion of said carrier;
    second deflecting means arranged to change the orientation of the beam from said second direction into a third direction at least substantially toward said axis and against the envelopes of articles borne by said peripheral portion; and
    means for influencing the at least one beam so that the beam impinges upon said directing means while advancing at least substantially at right angles to said axis, wherein said influencing means comprises at least one stationary cylinder lens arranged to focus the at least one beam upon a line coinciding at least substantially with said predetermined axis.

2. The apparatus of claim 1, further comprising means for focussing the at least one beam being propagated in said third direction at at least one at least substantially fixed point which is located at the envelopes of articles being supported at the periphery of and being moved sidewise by said carrier.

3. The apparatus of claim 1, further comprising five optical components in the path of said at least one beam from said predetermined axis toward said first deflecting means, said optical components including a series of discrete cylinder lenses located in the path of propagation of said at least one beam in said first direction toward said first deflecting means, said directing means including a rotary mirror having a plurality of facets arranged to direct said at least one beam upon discrete cylinder lenses and said cylinder lenses having foci on a line at least substantially coinciding with said predetermined axis.

4. The apparatus of claim 3, including means for interrupting the emission of said at least one beam between impingements of said at least one beam upon successive cylinder lenses of said series.

5. The apparatus of claim 1, wherein said directing means includes a polygonal mirror arranged to rotate about a second axis at least substantially parallel to said predetermined axis, said mirror having facets for turning said at least one beam about said predetermined axis and said mirror being arranged to return said at least one beam back to a starting position during each transition from directing the beam by one of said facets to directing the beam by another of said facets.

6. The apparatus of claim 5, including means for turning off said at least one beam at each return to said starting position.

7. The apparatus of claim 1 for perforating tubular envelopes of articles which are spaced apart from each other at said peripheral portion of said carrier, said directing means including a rotary polygonal mirror arranged to rotate about a second axis at least substantially parallel to said predetermined axis and said mirror having facets arranged to pivot said at least one beam about said predetermined axis, the number of said facets, the speeds of rotation of said carrier and said mirror about the respective axes, the length of said peripheral portion of said carrier and the spacing between the articles at said peripheral portion of said carrier being related to each other in such a way that, during directing of said at least one beam by one of said facets, the at least one beam impinges upon and perforates the envelopes of selected articles at the peripheral portion of said carrier and the envelopes of other articles at said peripheral portion are perforated during impingement of said at least one beam upon another of said facets following said one facet as seen in the direction of rotation of said mirror about said second axis.

8. The apparatus of claim 7, wherein said selected articles include the first, third, fifth, etc. articles at the peripheral portion of said carrier.

9. The apparatus of claim 7, further comprising means for focussing the beam being propagated in said third direction at at least one at least substantially fixed point which is located at the envelopes of articles being supported at the periphery of and being moved by said carrier, the relationship between the number of said facets, said speeds, said length of said peripheral portion of said carrier and the spacing between the articles being such that the envelopes which are not perforated during directing of the at least one beam by said one facet are perforated not earlier than upon the start of the next-following movement of the at least one beam and not later than upon arrival of the respective articles at the focal points of focussing means which were employed to focus the at least one beam upon the envelopes of articles immediately preceding the articles having envelopes already perforated by the at least one beam during directing of said at least one beam by said one facet.

10. The apparatus of claim 9, wherein said relationship is such that the envelope of each article is perforated only when the envelope portion to be perforated is located at said at least one at least substantially fixed point at which the at least one beam is focussed by said focussing beams.

11. The apparatus of claim 1 for perforating tubular envelopes of articles having longitudinal axes, further comprising means for rotating the articles about their longitudinal axes and relative to said peripheral portion of said carrier through an angle of n×360°, wherein n is a whole number including one.

12. The apparatus of claim 11, wherein said angle is selected from the group consisting of angles of 360° and 1080°.

13. The apparatus of claim 11, wherein said directing means includes a mirror having facets arranged to turn the at least one beam through a predetermined angle about said predetermined axis, and further comprising a plurality of means for focussing the at least one beam being propagated in said third direction at a plurality of at least substantially fixed points which are located at the envelopes of articles being supported at the periphery of and being moved sidewise by said carrier and rotating about their longitudinal axes through said angle of n×360° so that each envelope is provided with perforations at a plurality of locations at the circumferences of the articles, wherein n is a whole number including one.

14. The apparatus of claim 1, adapted to use at least two at least substantially parallel beams each of which is arranged to provide perforations in the envelopes of articles at the peripheral portion of said carrier.

15. The apparatus of claim 14, wherein said second deflecting means is arranged to direct said at least two beams in at least slightly convergent third directions at least substantially normal to the peripheral portion of said carrier.

16. The apparatus of claim 14, wherein at least one of said beams has an at least substantially circular cross-sectional outline.

17. The apparatus of claim 1, wherein said at least one beam has an at least substantially circular cross-sectional outline.

18. The apparatus of claim 1, wherein said first deflecting means comprises at least one stationary mirror located radially outwardly of the peripheral portion of said carrier.

19. The apparatus of claim 18, wherein said second deflecting means also comprises at least one stationary mirror located radially outwardly of said peripheral portion and spaced apart from said first deflecting means.

20. The apparatus of claim 1, further comprising means for focussing the beam being propagated in said third direction at at least one at least substantially fixed point which is located at the envelopes of articles being supported at the periphery of and being moved sidewise by said carrier, said focussing means comprising at least one spherical lens.

21. An apparatus for perforating tubular envelopes of rod-shaped articles of the tobacco processing industry, comprising:
an at least substantially drum-shaped carrier rotatable about a predetermined axis and having a peripheral portion arranged to support a plurality of articles for sidewise movement about said axis;
means for directing at least one beam of radiation in a first direction at least substantially radially outwardly of and away from said axis, the at least one beam of radiation being adapted to perforate the envelopes of articles borne by said carrier, wherein said directing means includes a polygonal mirror arranged to rotate about a second axis which is at least substantially parallel to said predetermined axis, said mirror having facets arranged to pivot said at least one beam about said predetermined axis;
first deflecting means arranged to change the orientation of the directed beam at a location radially outwardly of said peripheral portion in a second direction at least substantially parallel to said axis and radially outwardly of adjacent successive articles at the peripheral portion of said carrier;
second deflecting means arranged to change the orientation of the beam from said second direction into a third direction at least substantially toward said axis and against the envelopes of articles borne by said peripheral portion;
means for influencing the at least one beam so that the beam impinges upon said directing means while advancing at least substantially at right angles to said axis, wherein said influencing means comprises at least one first stationary cylinder lens arranged to focus the at least one beam upon a line coinciding at least substantially with said predetermined axis; and
at least one optical component in the path of said at least one beam from said predetermined axis toward said first deflecting means, wherein said at least one optical component has a focus on a line at least substantially coinciding with said predetermined axis, and wherein said at least one optical component includes a second stationary cylinder lens arranged to transform pivotal movements of said at least one beam about said predetermined axis into a parallel shifting of said at least one beam.

22. The apparatus of claim 21, wherein said carrier is arranged to rotate about said predetermined axis in a first direction and said mirror is arranged to rotate about said second axis in a second direction counter to the direction of rotation of said carrier.

23. The apparatus of claim 21, further comprising means for focussing the beam being propagated in said third direction at at least two of at least substantially fixed focal points which are located at the envelopes of articles being supported at the periphery of and being moved sidewise by said carrier, said focussing means and said at least one optical component being constructed and arranged to cooperate in such a way that said focussing means effects a parallel shifting of said at least one beam and said focal points are arranged in a line, as seen in the direction of rotation of said carrier.

24. The apparatus of claim 23, wherein said focussing means is arranged to establish five focal points.

25. The apparatus of claim 23, including means for interrupting the emission of said at least one beam between said focal points.

26. The apparatus of claim 21, wherein the number of said facets is such that, while impinging upon any one of said facets, said at least one beam is caused to turn about said predetermined axis through a predetermined angle.

27. The apparatus of claim 21, wherein said mirror has eight facets and said angle at least approximates 90°.

* * * * *